Patented Aug. 1, 1939

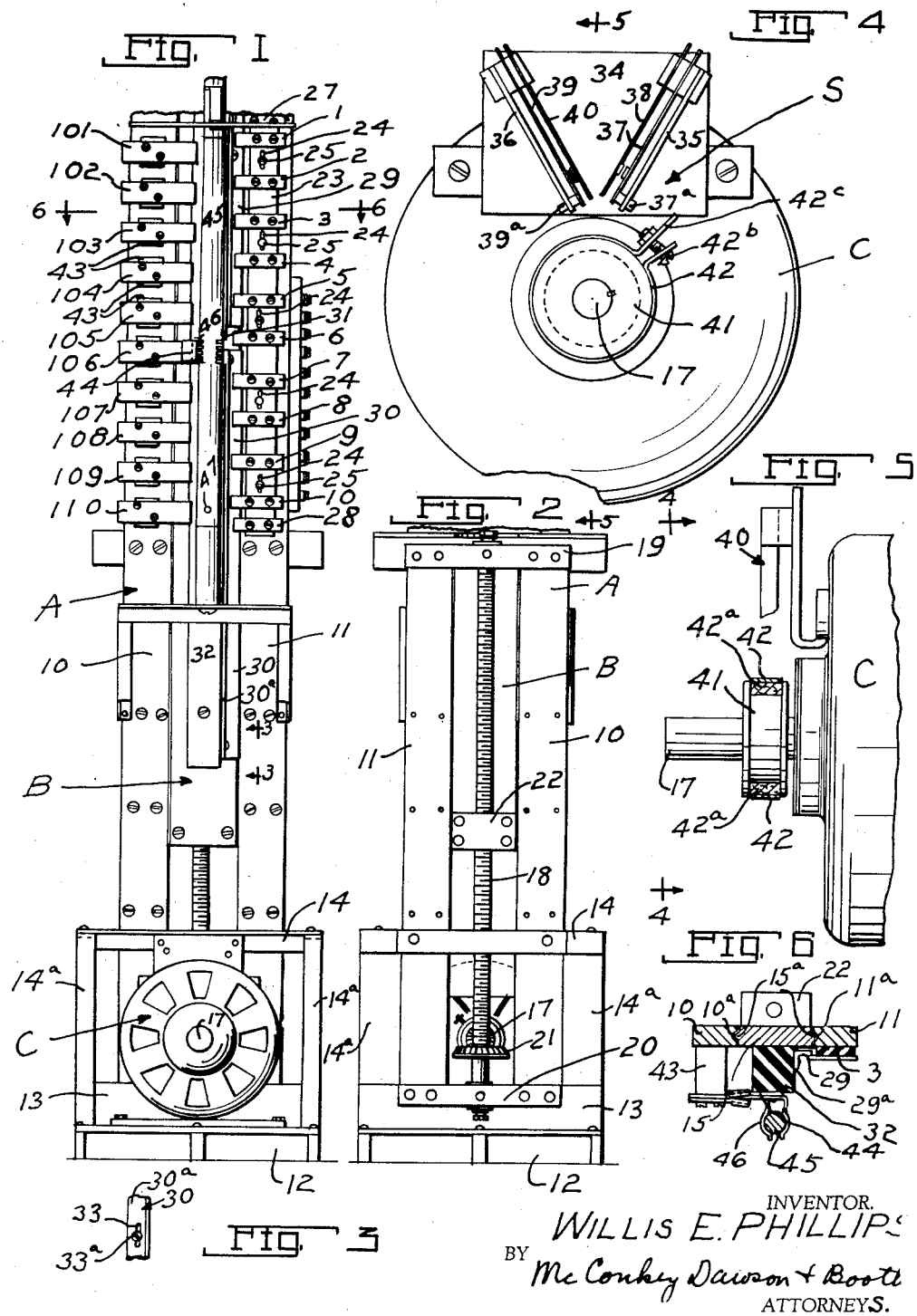

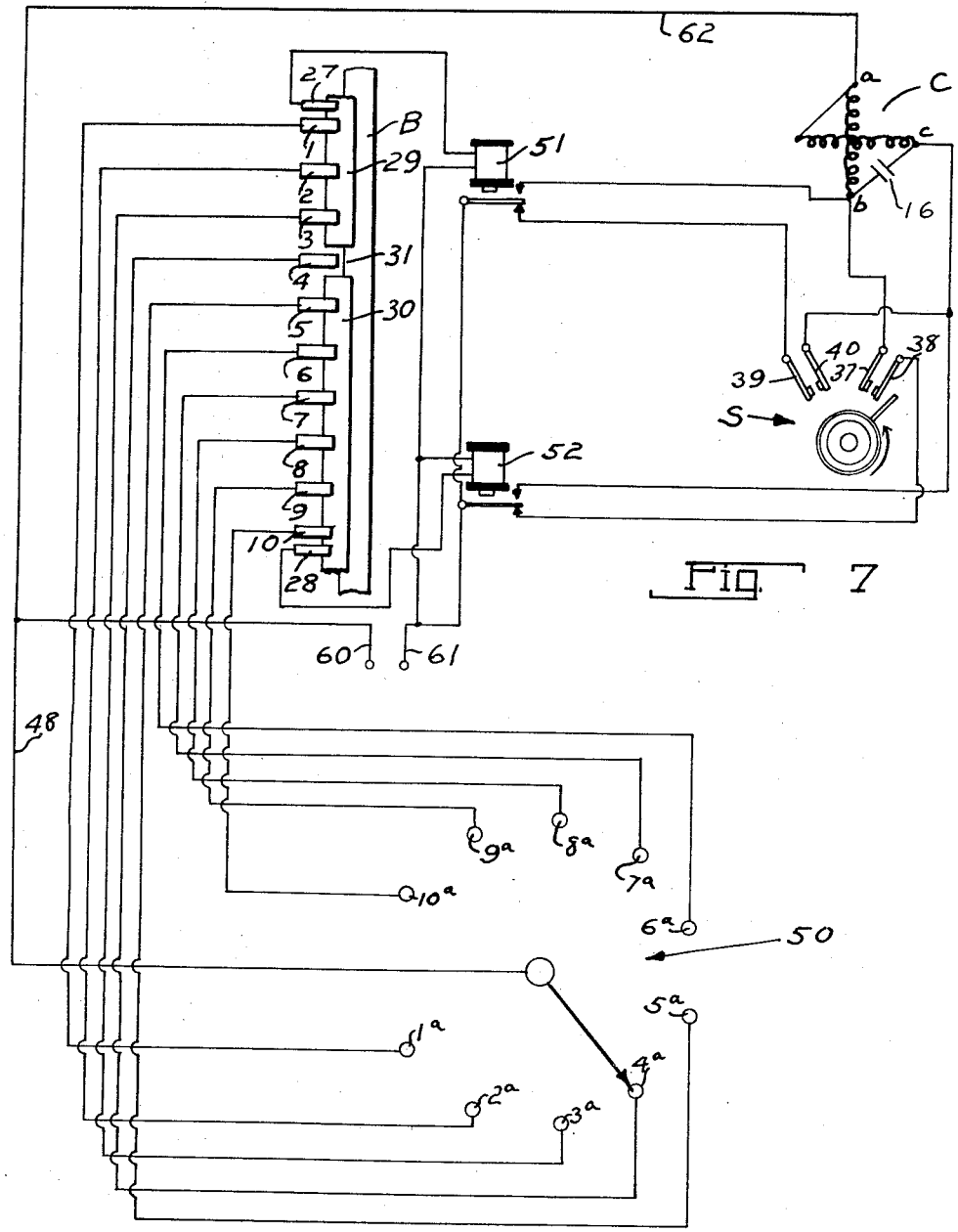

2,167,850

UNITED STATES PATENT OFFICE 2,167,850

REMOTE CONTROL APPARATUS

Willis E. Phillips, Chicago, Ill., assignor to Bendix Radio Corporation, Chicago, Ill., a corporation of Delaware Application November 26, 1937, Serial No. 176,521

3 Claims. (Cl. 172—239)

This invention relates to remote control apparatus and deals particularly with motor driven apparatus which is well adapted for controlling the functioning of electrical devices. The invention is useful for tuning a radio transmitter or receiver from a distance, and may be used in many other situations to accomplish various types of operation.

An object of the invention is to provide a control mechanism which may be operated from a distance and which is accurate and positive in movement. It is further desired that the control mechanism be rapid in movement so as to effect a change very quickly while at the same time being accurate in stopping its movement at a desired position.

In the past much difficulty has been experienced in stopping such motor operated mechanisms when the desired point has been reached. This is due to the fact that the momentum of the motor and moving parts tends to carry the movement of the control mechanism forward beyond the point at which the energy supplied to the motor is cut off. In many control systems commonly known in the art, the moving mechanism will move on beyond the selected position and then will be actuated to move backward again beyond the selected point, and will thus rock back and forth, perhaps finally coming to rest at the selected position, or perhaps continuing this oscillating movement known as "hunting". Such hunting of the moving mechanism is very objectionable and renders the apparatus both slow and indefinite of operation. It is an important object of this invention to provide apparatus not subject to hunting and free from the difficulties just explained.

A more specific object of the invention is to provide control apparatus in which an electric motor is employed as a source of power and which is equipped with dynamic braking means which is automatically effective when the control mechanism has been moved to a desired position. Another specific object is to provide an improved device for relieving the motor of the counter torque of the dynamic braking means when the motor has been completely stopped.

A further object of the invention is to provide control apparatus employing a reversible motor by which the movable control member may be driven in either direction with equal ease and accuracy of movement, and in which the movable control member will automatically be driven in the proper direction to reach a predetermined position.

Still another object is to provide improved motor operated mechanism for selecting one of a number of electrical circuits so that an electrical device associated with these circuits may be conveniently controlled from a remote point. Other objects and advantages will become apparent as the specification proceeds.

An embodiment of the invention is illustrated by the accompanying drawings in which:

Figure 1 is a front elevational view of the device;

Figure 2 is a broken rear elevational view showing the mechanical connection of the movable control member with the motor;

Figure 3 is a detail view showing the manner in which the conductor bars are mounted on the movable control member;

Figure 4 is an end elevational view of the motor and the associated switching device, the view being taken as indicated at line 4 of Figure 5;

Figure 5 is a broken part sectional view of the motor and associated switch device, the view being taken as indicated at line 5 of Figure 4;

Figure 6 is a sectional view taken as indicated at line 6—6 of Figure 1; and

Figure 7 is a schematic diagram illustrating the electrical circuits and connections.

As illustrated, A designates a frame; B, a movable control member mounted in the frame; and C, a motor mechanically connected to drive member B.

The frame A may be of any suitable form or character. In the embodiment illustrated, it includes a pair of spaced parallel members 10 and 11 which are supported in vertical position on base 12. The extreme lower ends of these members are held in proper position on base 12 by the angle members 13 which extend on front and rear of members 10 and 11 and are securely bolted to the base. A bracing structure 14 is attached to members 10 and 11 and includes the brace bars 14a which are secured at their lower ends to the base. As shown more clearly in Figure 6 of the drawings, the members 10 and 11 may each be of two parts and bolted or otherwise secured together, their adjacent edges being provided with bearing channels 10a and 11a.

The control member B is movably carried within the frame, and may be of any suitable form or character. As here shown, member B comprises a straight strip 15 which at its edges is equipped with beads 15a. This strip is disposed between members 10 and 11 and is slidable along these members, bearings being provided by the engagement of beads 15a with channels 10a and 11a.

The motor C is a reversible electric motor and is mounted in any suitable way in frame A. Preferably, this motor is of the condenser type in which the field is of one phase relation when the electric supply line is connected across field terminals $a$ and $b$ (see Figure 7) and is of another phase relation when the electric supply line is connected across field terminals $a$ and $c$. The different phase relationship in this type of reversible alternating current motor is effected by the presence of the condenser 16. Reversal of the direction of rotation is effected by changing the connection of the energy source from terminals $a$ and $b$ to terminals $a$ and $c$ or vice versa.

The invention is not limited, however, to the use of the condenser type motor, and any suitable reversible motor may be employed. A shunt wound direct current motor, for example, may be used; and in this case to produce rotation in an opposite direction, the applied voltage may simply be reversed without any change in the internal motor circuit.

The shaft 17 of motor C is mechanically connected with member B by any suitable gearing means. The gearing illustrated includes a screw shaft 18 journaled at its top and bottom in frame members 19 and 20 respectively. A bevel gear 21 secured on shaft 18 engages a companion gear on motor shaft 17, and by this connection the motor may rotate the screw shaft.

Secured to the movable control member B on its rearward side is a block 22 having a tapped hole with which screw shaft 18 makes engagement. It is apparent that rotation of shaft 18 in one direction drives member B upward and rotation of this shaft in an opposite direction drives member B downward.

As shown more clearly in Figure 1, member 11 of the frame has attached to it a contact carrier piece 23 which may be made of any insulating material. This piece is provided with slots 24 through which extend screws 25 by which the piece is secured to the frame. Carried on piece 23 at preferably equally spaced intervals are the contacts designated by numerals 1 to 10, and these contacts protrude inwardly in front of member B. The set of connecting posts 26 may be provided, if desired, for convenience in making electrical connection with each of contacts 1 to 10. At the bottom and top of the set of controls 1 to 10 are the contacts 27 and 28 which serve a purpose later explained.

Mounted on member B is a pair of conductor bars 29 and 30 which are secured in aligned positions with their adjacent ends spaced apart to provide a gap 31 between them. Contacts 1 to 10, 27 and 28 are adapted to make slidable contact with these bars. The manner of securing bars 29 and 30 to member B is shown more clearly in Figures 3 and 6. The piece 32 is secured to the front face of strip 15 and the bars 29 and 30 have flanges 29a and 30a respectively which are secured to piece 32. As shown in Figure 3, the flanges 29a and 30a are provided with slots 33 through which extend screws 33a by which the bars are attached.

On the face of frame member 10 may be mounted a second set of contacts 101 to 110 in spaced relation corresponding with the spacing between contacts 1 to 10, and if desired, one or more sets of similarly aligned contacts may be mounted on the back side of members 10 and 11. The insulators 43 may be used for the mounting of each of these contacts. A contact 44 is secured to piece 32 and adapted to make sliding engagement with each of contacts 101 to 110. If desired, a flexible wire might be connected to contact 44; but to eliminate bending of wires, I prefer to provide a bar 45 secured at its ends to frame members by means of insulators, and a spring clip 46 secured to member B which clip is in electrical connection with contact 44 and in suitable engagement with bar 45. The parts should be so positioned that when the member B is in such position that one of contacts 1 to 10 is in register with gap 31 an electrical path will be completed from connecting post 47 on bar 45 through spring clip 46, contact 44 and a corresponding one of contacts 101 to 110.

The switch which is associated with motor C and which controls the dynamic braking action, is designated by the character S and is more clearly illustrated in Figures 4 and 5 of the drawings. A plate 34 is mounted at the end of the motor casing and carries a pair of fixedly mounted stiff members 35 and 36 each of which are apertured at their end portions. These members serve as stops only and might simply be apertured ears projecting from the plate 34, or they may be omitted entirely, if desired. A pair of resilient contact fingers 37 and 38 are mounted on plate 34 so as to be insulated from each other. Normally these fingers are spaced apart. Finger 37 has attached thereto a pin 37a which extends through the aperture of member 35. A second pair of resilient contact fingers 39 and 40 are mounted on plate 34 in a position such as indicated in Figure 4. Finger 39 of this set has a pin 39a extending through the aperture of member 36.

A collar 41 is keyed to the motor shaft 17, and about this collar is fastened an arm member 42. The band portion of this arm member is provided with an annular lining 42a of felt or other suitable material. A bolt 42b connects the end portions of the band portion and is adapted to tighten the member about the shaft collar. The end portion 42c of the arm member 42 projects radially from the shaft and is adapted to engage the ends of pins 39a and 37a to bring the resilient fingers into electrical contact.

Wires connected to points 1 to 10 together with a wire 48 representing one side of a power supply line may extend in the form of a cable to the manually operated control switch 50 at any remote point, the line wire 48 being connected to the arm of switch 50 and the wires leading from contacts 1 to 10 connected to points 1a to 10a respectively of this switch.

Relay 51 has one end of its winding connected to the other side of the power supply line and has its other end connected to contact 27. A second relay 52 has one end of its winding connected also to the other side of the power supply line and has the other end of its winding connected to contact 28.

The contacts 101 to 110 may each be connected in one of a series of circuits, and post 47 may be connected in all these circuits so that when contact 44 engages one of contacts 101 to 110, a circuit will be completed through the one of these contacts being engaged. For example, contact 101 may be connected in a radio circuit tuned to one frequency, and contact 102 in a radio circuit tuned to another frequency and so on. Of the series of circuits, only the one connected to the contact being engaged will be completed. It will be understood that any number of circuits may be provided for by having a corresponding number of contacts.

Operation

Assuming that the position of movable member B in the frame is such that the gap 31 between conductors 29 and 30 is in register with contact No. 4 as shown in Figure 7, the contact 44 will be in engagement with contact No. 104 and the circuit through this contact 104 will be completed. If the circuit through contact 104 is a radio circuit tuned to one frequency the radio transmitter or receiver associated with this circuit will be operative on this frequency.

If the operator, who may be at a remote point, desires to complete a circuit through contact 108 as for tuning a radio transmitter to the frequency at which this circuit is tuned, the operator may turn on arm of switch 50 from point 4a to point 8a. This completes a circuit from the one side of the supply line, which for identification will be designated 60, through wire 48, point 8a of switch 50, contact 8, conductor bar 30, and through the winding of relay 52 to the other side of the supply line, designated 61. This causes relay 52 to draw its armature completing a circuit from side 60 of the supply line via wire 62 to terminal a of the motor field windings and from terminal C of the motor field windings to side 61 of the supply line, thus energizing the motor to rotate in a counterclockwise direction as indicated by the arrow in Figure 7.

Such rotation of the motor drives the screw shaft in such direction as to move member B downwardly, and such downward movement will continue until contact 8 is no longer in engagement with conductor bar 30, or in other words until the gap 31 comes into register with contact 8. The instant contact point 8 breaks electrical contact with conductor bar 30 the circuit through relay 52 is broken and this relay drops its armature which operation automatically opens the circuit containing terminals a and c of the motor field and closes a circuit containing terminals a and b. This latter circuit may be traced from the side 60 of the line to motor field terminal a, and from motor field terminal b, through spring contacts 37 and 38 to side 61 of the line. The spring contacts 37 and 38 will then be held in engagement by arm 42 since the frictional drive relation between arm 42 and the now counterclockwise moving motor shaft causes the arm to hold these finger contacts in engagement.

By the operation just explained the motor circuit which energizes the motor for counterclockwise rotation has been broken and the motor energizing circuit for clockwise rotation has been closed. The closing of this latter circuit produces a torque on the motor shaft which is effective in stopping its counterclockwise rotation very quickly. I have found that such dynamic braking action is effective in bringing the motor from full speed rotation to a complete stop in only one or two revolutions.

After the motor has come to a complete stop and has initiated movement in a clockwise direction, the arm 42 moves enough in a clockwise direction to release spring contacts 37 and 38, allowing these contacts to be separated. This opens the motor energizing circuit containing terminals a and b, and the motor remains unenergized, leaving the radio device or whatever device is being controlled, associated with the circuit through contact 108.

If, on the other hand, the operator had wished to select the circuit through contact 102, for example, he would have turned his switch 50 to point 2a which would operate, through the action of relay 51, to complete a motor energizing circuit for driving the motor clockwise in a direction counter to the arrow shown in Figure 7, and member B would be raised until gap 31 would come into register with contact 2. At this instant relay 51 would drop its armature, opening the circuit through field a—b, and closing the circuit through a—c and the then engaged contact fingers 39 and 40, thus dynamically braking the motor as before. Then upon initiation of movement of the motor shaft in a counterclockwise direction, the spring contacts 39 and 40 would be disengaged, deenergizing the motor entirely.

The gap 31 between conductors 29 and 30 should be slightly greater than the width of each of contact members 1 to 10, so that member B may be brought to a complete stop before the contact of the circuit selected can move into contact with the other one of conductors 29 and 30. Any "hunting" of the apparatus is definitely eliminated in this way.

The size of gap 31 may be varied by changing the position of conductor 29 or 30 on member B. It will be remembered that the screws 33a securing these conductor bars extend through slots 33 in the bars and vertical adjustment may easily be made. By changing the vertical position of conductor 30 on member B, the point at which the downward movement of member B is halted may be varied, and by changing the vertical position of conductor 29 on member B, the point at which the upward movement of member B is halted may be varied. By changing the vertical position of the contact carrying strip 23 on the frame, the positions at which movement in either direction is halted may be varied.

While in the embodiment of the invention just described, control is effected by closing some selected circuit of a group of circuits, the invention is not limited to control by the closing of electrical circuits. For example, the motor may be connected through suitable gearing so as to effect mechanical movements which in themselves determine the operation of the controlled device. The device can be used to effect any manner or type of control which can be associated with any position of the movable control member. The improved apparatus has many applications and may be embodied in many forms of construction. Also many changes may be made in the form and arrangement of the various parts of the apparatus without departing from the spirit of the invention.

The foregoing detailed description has been given for clearness of understanding only and no unnecessary limitations should be understood therefrom, but the appended claims should be construed as broadly as permissible in view of the prior art.

I claim:

1. In remote control apparatus, a controlled member movable to any of a plurality of predetermined positions, a reversible electric motor drivingly connected to said controlled member, spaced conductor bars mounted on said controlled member, a group of contacts engaging one of said conductor bars, a second group of contacts engaging the other of said conductor bars, a selector switch having switch points connected to said groups of contacts, an energizing circuit controlled by any selected one of said first group of contacts for producing clockwise rotation of said motor, a second energizing circuit controlled by any selected one of said second group of contacts for producing counter-clockwise rotation of said motor, a local reversing circuit associated with each of said energizing circuits, means for opening the selected energizing circuit and closing the associated reversing circuit upon arrival of said controlled member at the selected predetermined position, and means for opening said reversing circuit before said motor begins rotation in the reverse direction.

2. In remote control apparatus, a controlled member movable to any of a plurality of predetermined positions, a reversible electric motor drivingly connected to said controlled member, spaced conductor bars mounted on said controlled member, a group of contacts engaging one of said conductor bars, a second group of contacts engaging the other of said conductor bars, a selector switch having switch points connected to said groups of contacts, an energizing circuit controlled by any selected one of said first group of contacts for producing clockwise rotation of said motor, a second energizing circuit controlled by any selected one of said second group of contacts for producing counter-clockwise rotation of said motor, a local reversing circuit associated with each of said energizing circuits, a relay for opening the selected energizing circuit and closing the associated reversing circuit upon arrival of said controlled member at the selected predetermined position, and means for opening said reversing circuit before said motor begins rotation in the reverse direction.

3. In remote control apparatus, a controlled member movable to any of a plurality of predetermined positions, a reversible electric motor drivingly connected to said controlled member, spaced conductor bars mounted on said controlled member, a group of contacts engaging one of said conductor bars, a second group of contacts engaging the other of said conductor bars, a selector switch having switch points connected to said groups of contacts, an energizing circuit controlled by any selected one of said first group of contacts for producing clockwise rotation of said motor, a second energizing circuit controlled by any selected one of said second group of contacts for producing counter-clockwise rotation of said motor, a local reversing circuit associated with each of said energizing circuits, switch means in each of said reversing circuits, switch actuating means operated by said motor to maintain one of said switch means closed during operation of said motor, means for opening the selected energizing circuit and closing the associated reversing circuit upon arrival of said controlled member at the selected predetermined position, and means for opening said reversing circuit before said motor begins rotation in the reverse direction.

WILLIS E. PHILLIPS.